(12) United States Patent
Miyake (10) Patent No.: US 11,281,410 B2
(45) Date of Patent: Mar. 22, 2022

(54) IMAGE FORMING APPARATUS

(71) Applicant: KYOCERA Document Solutions Inc., Osaka (JP)

(72) Inventor: Masayuki Miyake, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 17/201,049

(22) Filed: Mar. 15, 2021

(65) Prior Publication Data

US 2021/0294542 A1    Sep. 23, 2021

(30) Foreign Application Priority Data

Mar. 19, 2020 (JP) .............................. JP2020-049968

(51) Int. Cl.
*G06F 3/12* (2006.01)

(52) U.S. Cl.
CPC .......... *G06F 3/1219* (2013.01); *G06F 3/1258* (2013.01)

(58) Field of Classification Search
CPC .............................. G06F 3/1219; G06F 3/1258
See application file for complete search history.

(56) References Cited

U.S. PATENT DOCUMENTS

| | | | |
|---|---|---|---|
| 2005/0018219 A1* | 1/2005 | Senn ..................... | H04N 1/6044 358/1.8 |
| 2007/0024657 A1* | 2/2007 | Zhang .................. | H04N 1/6033 347/19 |
| 2010/0238222 A1* | 9/2010 | Jogo ..................... | B41J 2/16526 347/14 |
| 2013/0201234 A1* | 8/2013 | Sasayama .............. | B41J 2/2146 347/12 |
| 2015/0169255 A1* | 6/2015 | Arakawa .............. | H04N 1/4097 358/1.14 |

FOREIGN PATENT DOCUMENTS

| | | |
|---|---|---|
| JP | 2005-169627 | 6/2005 |
| JP | 2009-220394 | 10/2009 |

* cited by examiner

*Primary Examiner* — King Y Poon
*Assistant Examiner* — Michael Burleson
(74) *Attorney, Agent, or Firm* — Lex IP Meister, PLLC (57) ABSTRACT

The controller causes the print engine to perform preliminary ejection on a maintenance sheet that is a print sheet different from the print sheet of the user document image, and to print an inspection chart image on a maintenance sheet. The controller causes, to be displayed on a predetermined display device, the maintenance sheet setting screen allowing a user to specify output conditions for the preliminary ejection and the printing of the inspection chart image, and specifies the output condition specified by the user on the maintenance sheet setting screen, and when an output condition is satisfied in printing the user document image by the print engine, the controller causes the print engine to automatically perform the preliminary ejection and printing of the inspection chart image on the maintenance sheet.

7 Claims, 9 Drawing Sheets

IMAGE FORMING APPARATUS

INCORPORATION BY REFERENCE

This application is based upon and claims the benefit of priority from Japanese Patent Application No. 2020-049968, filed on Mar. 19, 2020, the entire contents of which are incorporated herein by reference.

The present disclosure relates to an image forming apparatus.

BACKGROUND

Some inkjet discharge inspection apparatuses control preliminary eject ink to form an image for inspection on a specific image receiving layer film when preliminary ejection is performed, thereby saving ink.

Other inkjet recording apparatuses perform preliminary ejection for each predetermined number of prints.

Normally, an inkjet type image forming apparatus performs preliminary ejection in order to maintain quality. On the other hand, some image forming apparatuses print an inspection pattern and output an inspection chart for a user to visually inspect a nozzle state or the like, separately from a print product of a user document.

To solve the problem that when preliminary ejection is performed on a print sheet different from a print sheet that a user document image is printed so as not to cause deterioration in image quality of the print sheet of the user document image, the sheet is not used after the preliminary ejection and is wasted. Therefore, it is conceivable that preliminary ejection and the output of the inspection chart may be performed on one print sheet.

However, appropriate execution conditions for the preliminary ejection and the output of the inspection chart, such as the timing at which the preliminary ejection is to be executed and the timing at which the inspection chart is to be output, differ depending on the usage state of the user. In a case where such execution conditions are fixedly set, there is a possibility that wasteful consumption of the print sheet is not appropriately suppressed in accordance with the usage state of the user.

SUMMARY

An image forming apparatus according to the present disclosure includes a print engine and a controller. The print engine prints an image to be printed on a print sheet by an inkjet method. The controller causes the print engine to print a user document image, to perform preliminary ejection onto a maintenance sheet that is a print sheet different from a print sheet of the user document image, and to print an inspection chart image onto the maintenance sheet. Then, the controller (a) displays a maintenance sheet setting screen on a predetermined display device, the maintenance sheet setting screen allowing a user to specify output conditions for the preliminary ejection and the printing of the inspection chart image, (b) specifies the output condition specified by the user on the maintenance sheet setting screen, and (c) causes the print engine to automatically perform the preliminary ejection and the printing of the inspection chart image on the maintenance sheet if the output condition is satisfied when the user document image is printed by the print engine.

The above and other objects, features and advantages of the present disclosure will become more apparent from the following detailed description taken in conjunction with the accompanying drawings.

DETAILED DESCRIPTION

Hereinafter, embodiments of the present disclosure will be described with reference to the drawings.

First Embodiment

Figure 1:
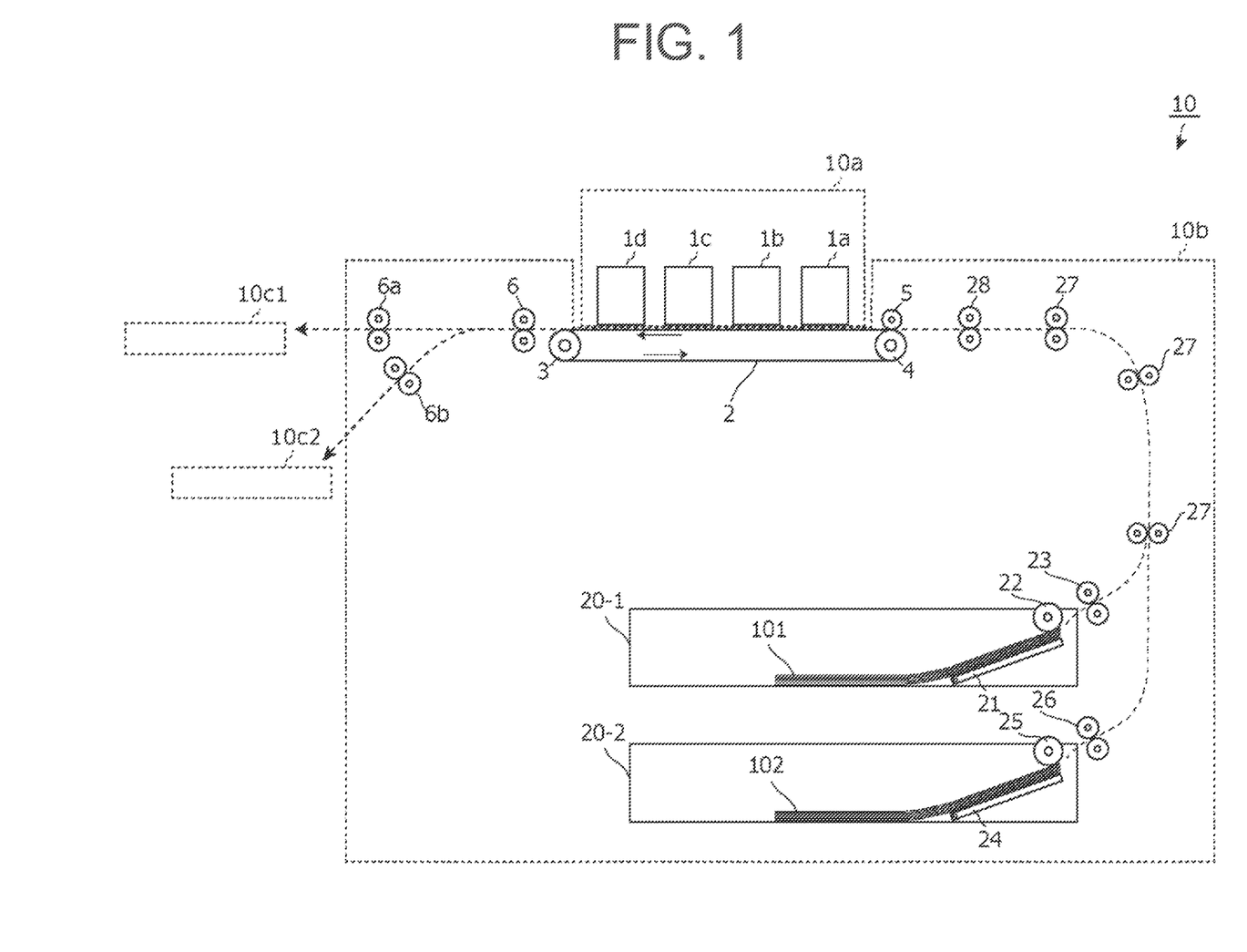
FIG. 1 is a side view illustrating a mechanical internal configuration of an image forming apparatus 10 according to an embodiment of the present disclosure.
Figure 2:
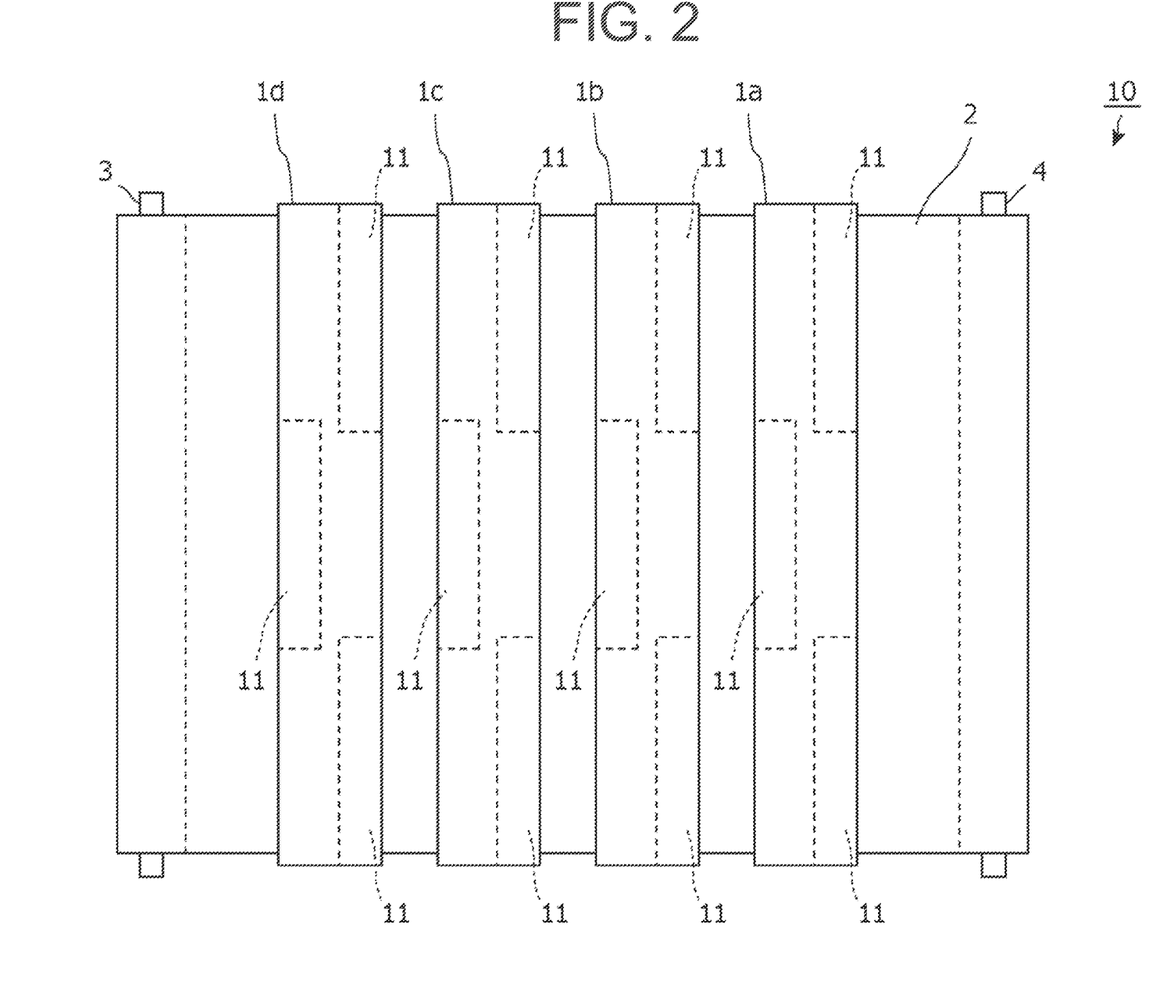
FIG. 2 is a plan view of the image forming apparatus 10 shown in FIG. 1.

FIG. 1 is a side view illustrating a mechanical internal configuration of an image forming apparatus according to an embodiment of the present disclosure. FIG. 2 is a plan view of the image forming apparatus shown in FIG. 1.

The image forming apparatus 10 according to this embodiment is an apparatus such as a printer, a copying machine, a facsimile machine, or a multifunction peripheral, and includes a line head type inkjet color printing system in this embodiment.

The image forming apparatus 10 illustrated in FIG. 1 includes a print engine 10a and a sheet conveying unit 10b. The print engine 10a physically prints an image to be printed on a print sheet (print paper, or the like). The sheet conveying unit 10b conveys the print sheet to the print engine 10a.

In this embodiment, the print engine 10a includes line head type inkjet recording units 1a to 1d corresponding to four ink colors of cyan, magenta, yellow, and black.

As shown in FIG. 2, in this embodiment, each inkjet recording unit 1a, 1b, 1c, 1d has a plurality of (three in this case) head units 11. The head units 11 are arranged along the main scanning direction and are detachable from an apparatus main body. The number of head units 11 in each of the inkjet recording units 1a, 1b, 1c and 1d may be one.

Further, in this embodiment, the sheet conveying unit 10b includes an annular conveying belt 2 facing the print engine 10a and conveying the print sheet, a driving roller 3 and a driven roller 4 around which the conveying belt 2 is suspended, a suction roller 5 nipping the print sheet together with the conveying belt 2, and a pair of discharge rollers 6, 6a, and 6b.

The driving roller 3 and the driven roller 4 cause the conveying belt 2 to circulate. Then, the print sheet conveyed from sheet feeding cassettes 20-1 and 20-2 described later is nipped by the suction roller 5, and the nipped print sheet is sequentially conveyed by the conveying belt 2 to print positions of the inkjet recording units 1a to 1d, and images of respective colors are printed by the inkjet recording units 1a to 1d. Then, the printed sheet after completion of printing is discharged to discharge trays 10c1, 10c2 or the like by the pair of discharge rollers 6, 6a and 6b.

This image forming apparatus includes at least two discharge trays 10c1 and 10c2, and the print sheet after completion of printing is discharged to the discharge tray 10c1 by the discharge roller pair 6a or discharged to the discharge tray 10c2 by the discharge roller pair 6b.

Further, the sheet conveying unit 10b includes a plurality of sheet feed cassettes 20-1 and 20-2. The sheet feed cassettes 20-1 and 20-2 contain print sheets 101 and 102, and lift plates 21 and 24 push up the print sheets 101 and 102 to bring them into contact with pickup rollers 22 and 25. The print sheets 101 and 102 placed in the sheet feed cassettes 20-1 and 20-2 are picked up one by one from above by the pickup rollers 22 and 25 to paper feed rollers 23 and 26. The paper feed rollers 23 and 26 are rollers for conveying the print sheets 101 and 102 fed from the sheet feed cassettes 20-1 and 20-2 by the pickup rollers 22 and 25 one by one onto the conveyance path.

A conveying roller 27 is a roller provided on a conveying path common to the print sheets 101 and 102 conveyed from the sheet feeding cassettes 20-1 and 20-2.

A registration roller 28 temporarily stops the conveyed print sheets 101 and 102, and convey the print sheets 101 and 102 to the print engine 10a at a secondary paper feed timing. The secondary paper feed timing is designated by a controller 81 described later so that an image is formed at a designated position on the print sheets 101 and 102.

The discharge trays 10c1 and 10c2 are used as a plurality of sheet discharge units that can be selected as discharge destinations of print sheets on which printing has been completed in the print engine 10a.

Figure 3:
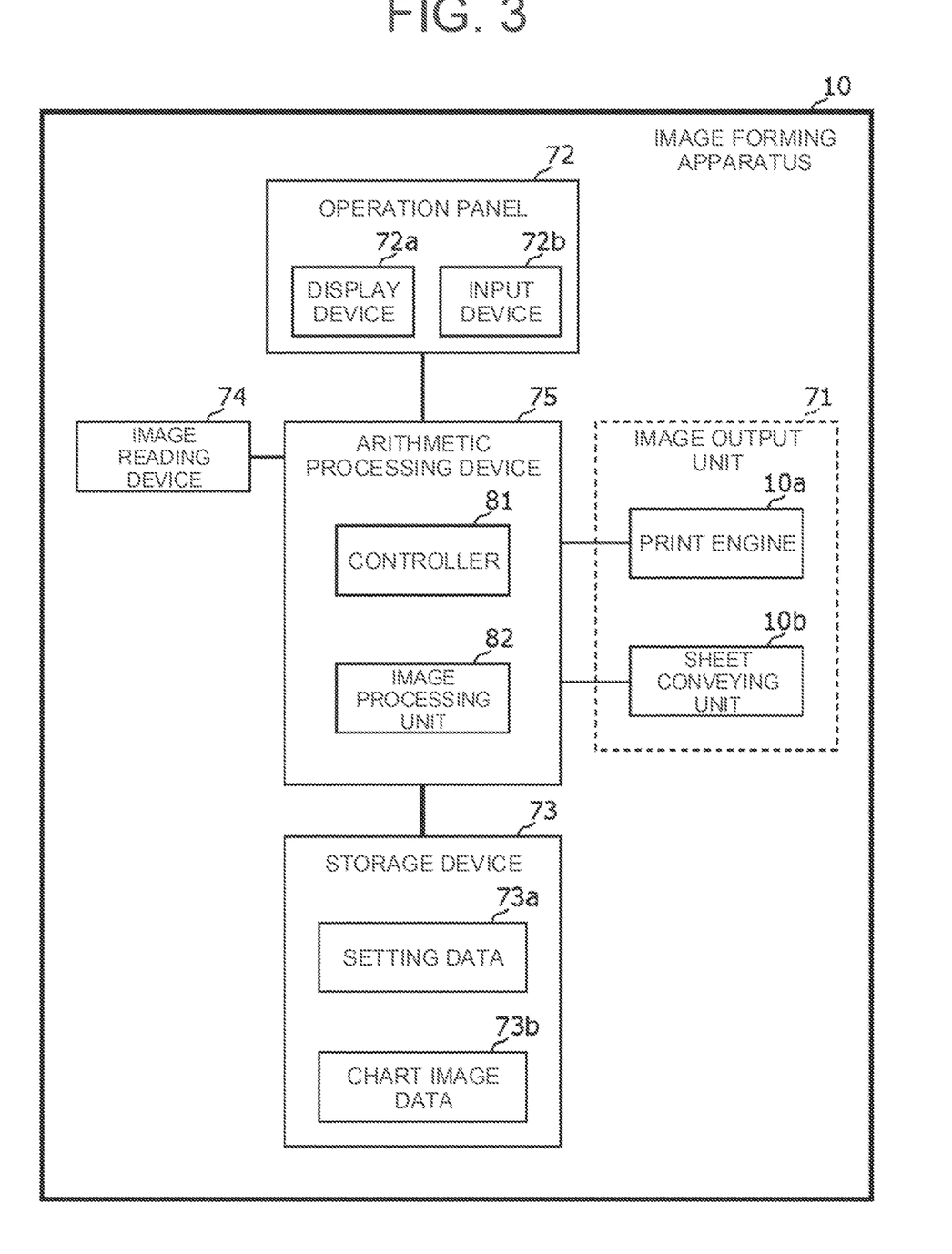
FIG. 3 is a block diagram illustrating an electrical configuration of the image forming apparatus 10 according to the embodiment of the present disclosure.

FIG. 3 is a block diagram illustrating an electrical configuration of the image forming apparatus 10 according to the embodiment of the present disclosure. As shown in FIG. 3, the image forming apparatus 10 further includes an operation panel 72, a storage device 73, an image reading device 74, and an arithmetic processing device 75, in addition to an image output unit 71 having the mechanical configuration illustrated in FIGS. 1 and 2.

The operation panel 72 is disposed on a housing of the image forming apparatus 10 and includes a display device 72a such as a liquid crystal display and an input device 72b such as a hard key and a touch panel. The operation panel 72 displays various messages on the display device 72a to a user and receives user operations on the input device 72b.

The storage device 73 is a non-volatile storage device (flash memory, hard disk drive, or the like) that stores data, programs, and the like necessary for controlling the image forming apparatus 10. The storage device 73 stores setting data 73a and chart image data 73b. The setting data 73a indicates an output condition described later.

The image reading device 74 includes a platen glass and an automatic document feeder, optically reads an image of a document placed on the platen glass or a document conveyed by the automatic document feeder, and generates image data of the image.

The arithmetic processing device 75 includes a computer that operates according to a program, an ASIC (Application Specific Integrated Circuit) that executes a predetermined operation, and the like, and operates as various processing units. The computer includes CPU (Central Processing Unit), ROM (Read Only Memory), RAM (Random Access Memory), and the like, loads programs stored in the ROM, the storage device 73, and the like, into the RAM, and executes the programs by the CPU, thereby operating as various processing units (together with the ASIC as necessary).

Here, the arithmetic processing device 75 operates as the controller 81 and an image processing unit 82.

The controller 81 controls the image output unit 71 (the print engine 10a, the sheet conveying unit 10b, and the like) and executes a print job requested by the user. In this embodiment, the controller 81 causes the image processing unit 82 to execute predetermined image processing, and controls the print engine 10a (head unit 11) to eject ink to form a print image on the print sheet. The image processing unit 82 performs predetermined image processing such as RIP (Raster Image Processing), color conversion, and halftoning onto the image data to be printed on the print sheet.

For example, the controller 81 causes the print engine 10a to print a user document image based on the print image designated by the user. Further, the controller 81 causes the print engine 10a to perform preliminary ejection on the maintenance sheet and print the inspection chart image onto the maintenance sheet. Here, the maintenance sheet is a print sheet different from the print sheet of the user document image.

Here, the "preliminary ejection" is an operation of ejecting ink from all ink nozzles of the head unit 11 not for the purpose of image formation but for the purpose of maintenance. Here, the inspection chart image is formed by the ink ejected by the preliminary ejection.

In particular, the controller 81 (a) displays on a predetermined display device a maintenance sheet setting screen that allows the user to specify output conditions for preliminary ejection and printing of an inspection chart image, (b) specifies the output conditions specified by the user on the maintenance sheet setting screen, and (c) causes the print engine 10a to automatically perform preliminary ejection and printing of an inspection chart image on the maintenance sheet if the output conditions are satisfied when causing the print engine 10a to print a user document image.

In this embodiment, the predetermined display device is the display device 72a of the operation panel 72, but may be a display device in a remote terminal device such as a host device. In this case, the terminal device and the image forming apparatus 10 are connected via a communication path such as a network. The image data of the maintenance sheet setting screen is transferred from the image forming apparatus 10 to the terminal device, and the user operation performed on the maintenance sheet setting screen is similarly transferred from the terminal device to the image forming apparatus 10 (the controller 81).

Figure 4:
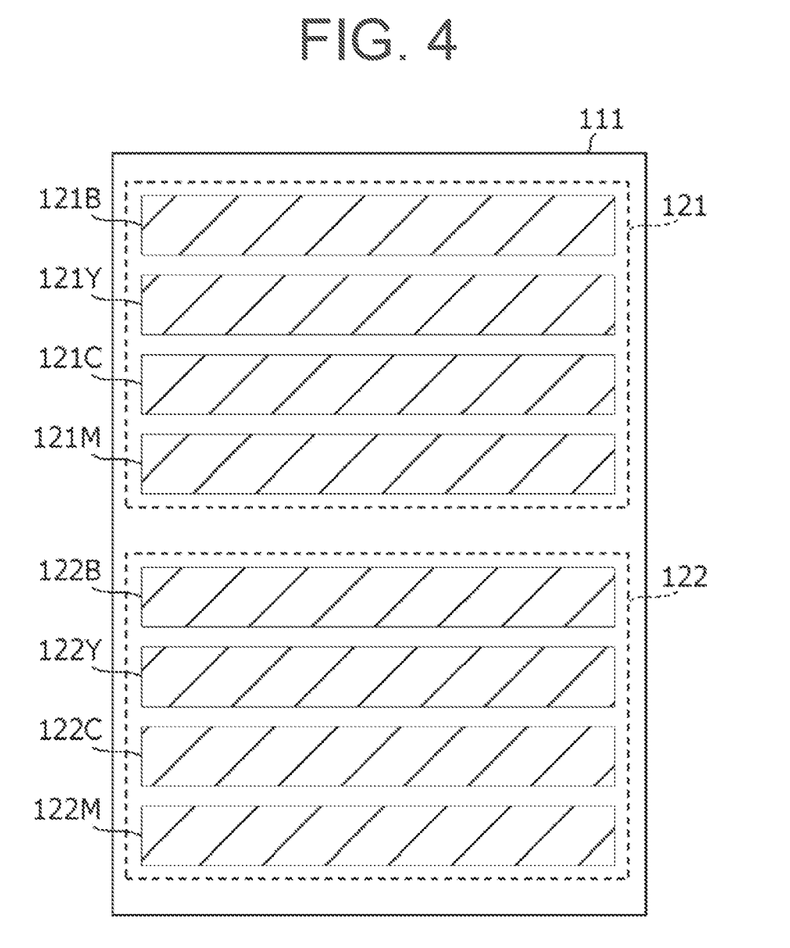
FIG. 4 is a diagram illustrating an example of a maintenance sheet after preliminary ejection and inspection chart printing.

FIG. 4 is a diagram illustrating an example of a maintenance sheet after preliminary ejection and inspection chart printing. In this embodiment, for example, as shown in FIG. 4, as the inspection chart image, a first image 121 for confirming ejection of all nozzles and a second image 122 for confirming density unevenness and preventing ejection failure nozzles are formed on the maintenance sheet 111 using all ink nozzles as preliminary ejection. The first image 121 illustrated in FIG. 4 includes a first image 121B of black ink, a first image 121Y of yellow ink, a first image 121C of cyan ink, and a first image 121M of magenta ink. The second image 122 illustrated in FIG. 4 includes a second image 122B of black ink, a second image 122Y of yellow ink, a second image 122C of cyan ink, and a second image 122M of magenta ink.

In this embodiment, the above-described output conditions include (a) an execution frequency condition of preliminary ejection and printing of the inspection chart image, and (b) an ink color condition indicating an ink color in which preliminary ejection and printing of an inspection chart image are to be executed. In this embodiment, the execution frequency condition indicates the number of prints indicating the execution interval between the preliminary ejection and the printing of the inspection chart image, and the ink color condition indicates the ink color of yellow, cyan, magenta, and black for which the preliminary ejection and the printing of the inspection chart image are to be executed. When the performance frequency condition is satisfied, the controller 81 causes the print engine 10a to (a) perform preliminary ejection and print an inspection chart image on the maintenance sheet for an ink color designated by the ink color condition, and (b) not perform preliminary ejection and printing of an inspection chart image for an ink color not designated by the ink color condition even when the performance frequency condition is satisfied.

Further, in this embodiment, the output condition includes an image designation condition for designating an image to be used for the inspection chart image. The image designation condition designates any one of a first image, a second image whose ink consumption is lower than that of the first image, and a user image, as an inspection chart image.

Here, the first image is a chart image for image quality priority, the second image is a chart image for ink saving, and the user image is a chart image based on chart image data stored in a document box of the user in the storage device 73.

Figure 5:
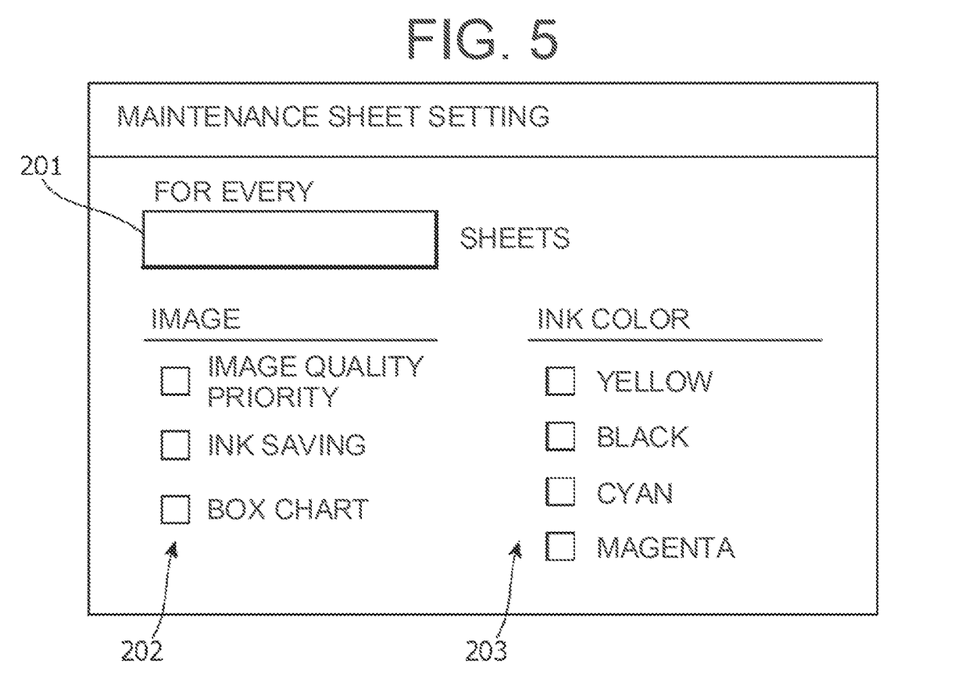
FIG. 5 is a diagram illustrating an example of a maintenance sheet setting screen displayed by the image forming apparatus 10 shown in FIG. 1.

FIG. 5 is a diagram illustrating an example of the maintenance sheet setting screen displayed by the image forming apparatus 10 illustrated in FIG. 1. The maintenance sheet setting screen illustrated in FIG. 5 includes an input field 201 for inputting an execution frequency condition (the number of prints), a list 202 including check boxes for inputting image designation conditions, and a list 203 including check boxes for inputting ink color conditions. The user operates the input device 72b (or the input device of the terminal device) to input the desired number of prints as the output interval of the maintenance sheet into the input field 201, checks one check box corresponding to a desired inspection chart image in the list 202, and checks one or more check boxes corresponding to desired ink colors in the list 203. The controller 81 specifies the output condition designated by the user using the input device 72b.

Figure 6:
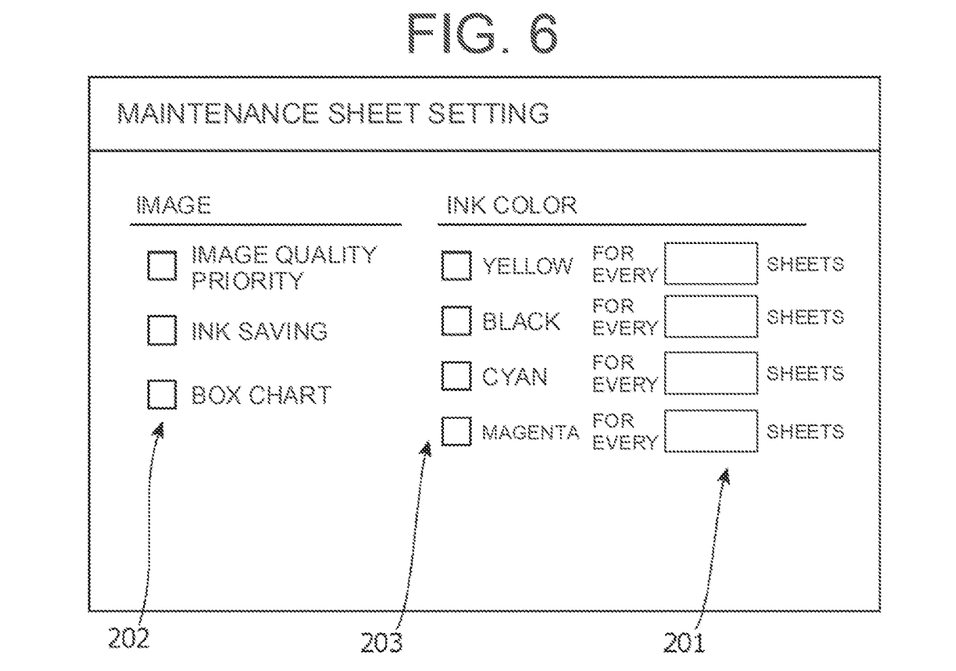
FIG. 6 is a diagram illustrating another example of the maintenance sheet setting screen displayed by the image forming apparatus 10 shown in FIG. 1.

FIG. 6 is a diagram illustrating another example of the maintenance sheet setting screen displayed by the image forming apparatus 10 illustrated in FIG. 1. In the maintenance sheet setting screen shown in FIG. 6, an input field 201 is provided for each ink color, and an execution frequency condition (number of prints) is designated independently for each ink color.

Figure 7:
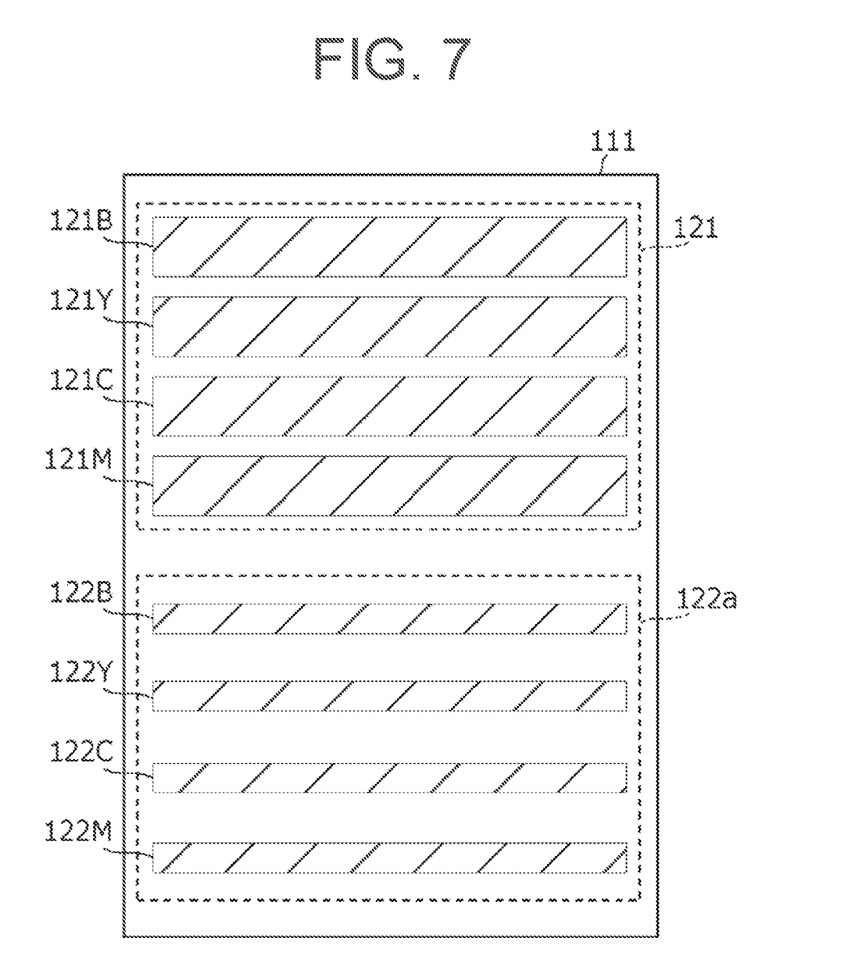
FIG. 7 is a diagram illustrating another example of the maintenance sheet after the preliminary ejection and the inspection chart printing.

FIG. 7 is a diagram illustrating another example of the maintenance sheet after the preliminary ejection and the inspection chart printing.

For example, when the first image is selected as the image designation condition (that is, when the check box of the item "image quality priority" in FIG. 5 or FIG. 6 is checked), an inspection chart image as shown in FIG. 4 is printed, for example. When the second image is selected as the image designation condition (that is, when the check box of the item "ink saving" in FIG. 5 or FIG. 6 is checked), an inspection chart image as shown in FIG. 7 is printed, for example. Unlike the second image 122 in the inspection chart image shown in FIG. 4, the second image 122a in the inspection chart image shown in FIG. 7 does not include an image for checking density unevenness. Therefore, ink consumption is low.

When the user image is selected as the image designation condition (i.e. when the check box of the item "box chart" in FIG. 5 or FIG. 6 is checked), the controller 81 displays a dialog including a list of chart image data of the user stored in a predetermined document box on a predetermined display device (e.g. the display device 72a), detects a user operation of selecting any chart image data from the list by a predetermined input device (e.g. the input device 72b), and specifies the chart image data designated by the user (i.e. inspection chart image designated by the user). When the user performs an operation for registering new chart image data in the dialog, the controller 81 saves the new chart image data designated by the user (such as data stored in advance in another document box or chart image data of an inspection chart image read by the image reading device 74 from an inspection chart desired by the user) in the document box and adds the new chart image data to the list.

Further, in this embodiment, after the output maintenance sheet is set on the platen glass or the automatic document feeder by the user, the image reading device 74 optically reads an image of the maintenance sheet and generates image data of the read image. Then, the controller 81 (a) causes the print engine 10a to print a page number of the user document image printed immediately before or after the maintenance sheet on the maintenance sheet, (b) thereafter causes the image reading device 74 to read the image of the maintenance sheet as described above, (c) inspects the image of the maintenance sheet, and (d) displays the page number and the inspection result for each maintenance sheet on a predetermined display device. The predetermined display device may be the same as or different from the predetermined display device described above. Here, in the inspection of the image of the maintenance sheet, it is determined whether there is an image defect or density unevenness due to ink non-ejection in the image of the maintenance sheet.

Next, the operation of the image forming apparatus 10 will be described.

Figure 8:
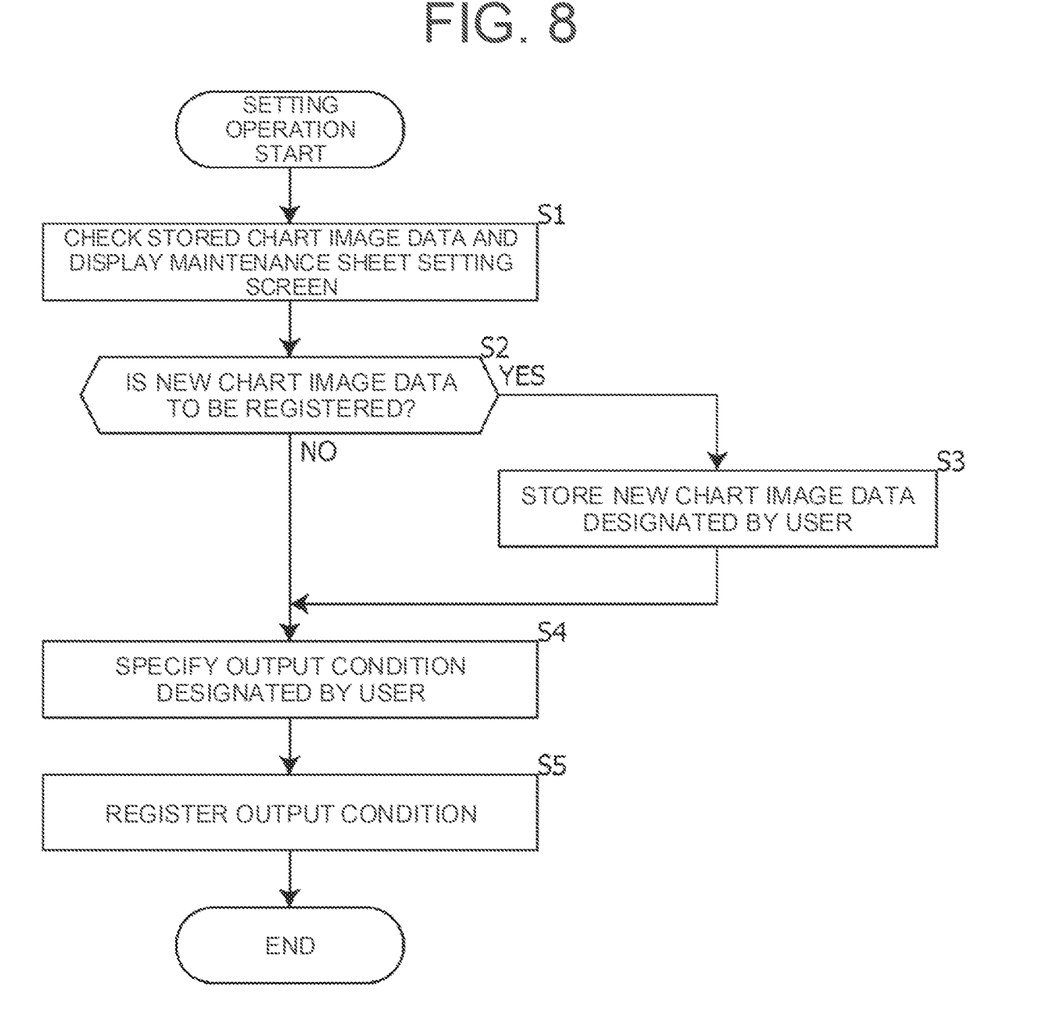
FIG. 8 is a flowchart for explaining the operation of the image forming apparatus 10 shown in FIG. 1 when the maintenance sheet is set.

(a) Operation when a maintenance sheet is set FIG. 8 is a flowchart for explaining the operation of the image forming apparatus 10 shown in FIG. 1 when the maintenance sheet is set.

When a predetermined user operation on the input device 72b or the like is detected, the controller 81 starts the maintenance sheet setting. First, the controller 81 checks the chart image data 73b stored in the storage device 73 (that is, the first image, the second image, the user image, and the like), and displays the maintenance sheet setting screen including a list of chart images corresponding to the stored chart image data 73b on a predetermined display device (step S1).

Thereafter, the user operates the input device 72b or the like to input the above-described output condition to the maintenance sheet setting screen. At this time, when the user performs a user operation for registering a new chart image data, the controller 81 determines to register the chart image (step S2), and stores and registers the new chart image data designated by the user in a predetermined document box of the storage device 73 (step S3).

Then, the controller 81 specifies an output condition designated by the user through the input device 72b or the like (step S4), and registers the output condition as an output condition (as the setting data 73a) to be used for subsequent print processing by the user (step S5).

Figure 9:
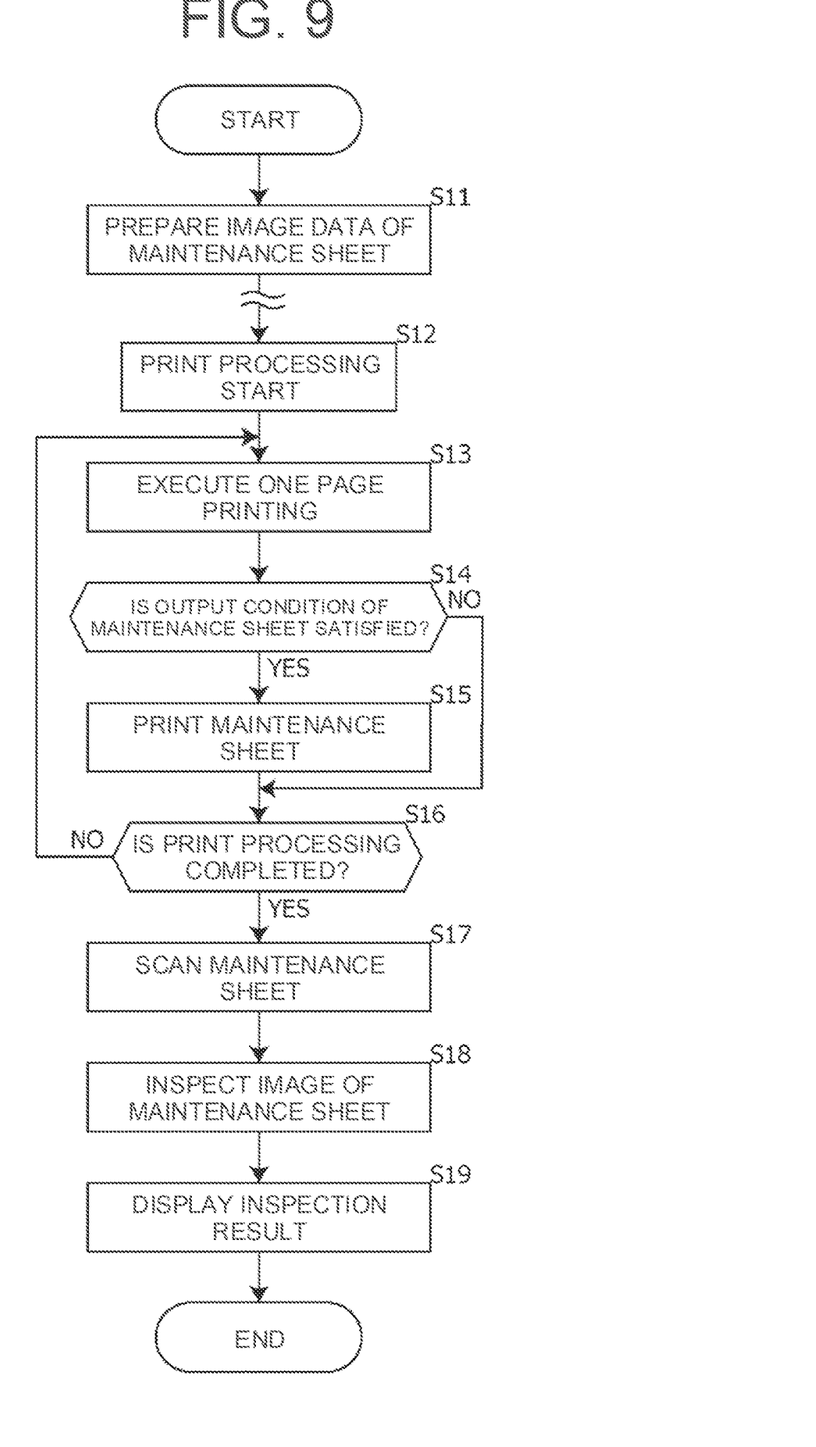
FIG. 9 is a flowchart for explaining the operation of the image forming apparatus 10 shown in FIG. 1 during print processing.
Figure 10:
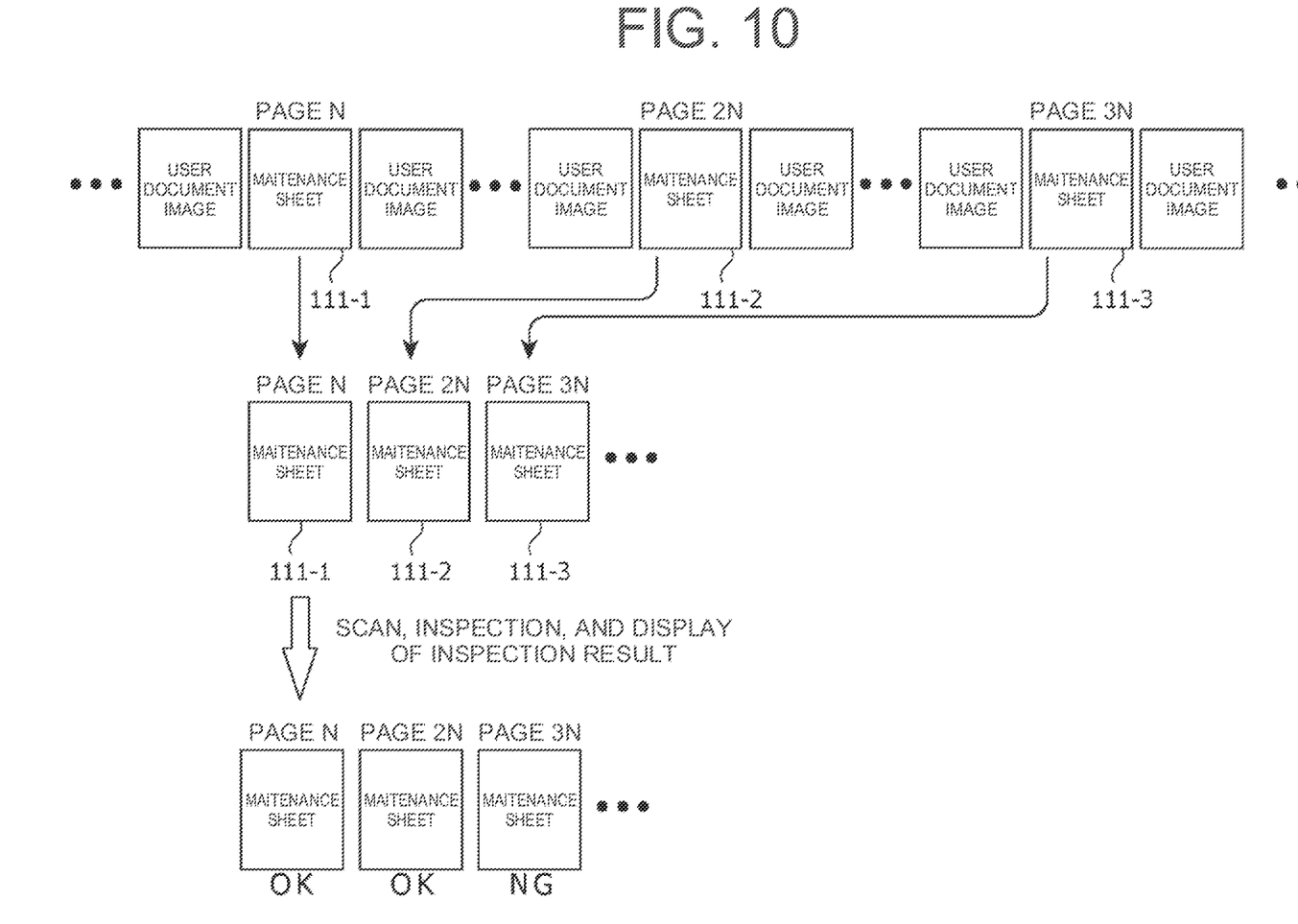
FIG. 10 is a diagram illustrating an inspection based on a maintenance sheet during print processing of the image forming apparatus 10 shown in FIG. 1.

(b) Operation during print processing FIG. 9 is a flowchart for explaining the operation of the image forming apparatus 10 shown in FIG. 1 during print processing. FIG. 10 is a diagram illustrating an inspection based on the maintenance sheet during print processing by the image forming apparatus 10 illustrated in FIG. 1.

When the image forming apparatus 10 is started, the controller 81 secures a storage area having a size required for the maintenance sheet in the RAM of the arithmetic processing device 75, and stores and prepares image data of the maintenance sheet in the storage area (step S11). Further, the controller 81 reads the setting data 73a (that is, the output condition) from the storage device 73.

Thereafter, when a job request based on a user operation on the operation panel 72 is received or a job request from a host apparatus of a user is received by a communication apparatus (not shown), the controller 81 causes the image output unit 71 to execute the requested print processing. After the print processing is started (step S12), the controller 81 causes the image output unit 71 to print an image of one page (first page or subsequent page) in the print processing (step S13), and determines whether the output condition (that is, the above-described performance frequency condition) is satisfied (here, whether the number of prints from the previous output of the maintenance sheet has reached the number of prints of the performance frequency condition) for each page (step S14).

If the output condition is satisfied, the controller 81 causes the print engine 10a to print the maintenance sheet according to the output condition as described above (step S15).

The number of printed pages after the previous maintenance sheet is counted by the controller 81. The count value is stored in the nonvolatile storage device 73, and when the maintenance sheet is output, the count value is reset to 0.

Then, the controller 81 determines whether the print processing is completed (step S16), and if the print processing (that is, the printing of all page images) is not completed, the controller 81 returns to step S13 and executes the processing step S13 and thereafter, until the print processing is completed.

After the print processing is completed, the user sets one or a plurality of printed and output maintenance sheets in the image reading device 74 (for example, collectively in an automatic document feeder), and performs the user operation for causing the image reading device 74 to execute image reading of the maintenance sheets, to the input device 72b.

When the user operation is detected in the input device 72b, the controller 81 causes the image reading device 74 to read the image of the maintenance sheet, and acquires the image read from the maintenance sheet, from the image reading device 74 (step S17).

Next, based on the image data, the controller 81 detects the page number printed on the maintenance sheet, inspects the image of the maintenance sheet (step S18), and displays the inspection result together with the page number on a predetermined display device (step S19).

For example, in a case where the number of prints N as the performance frequency condition is set to 100, when printing of 350 user document images is performed, as shown in FIG. 9, a maintenance sheet 111-1 on page 100, a maintenance sheet 111-2 on page 200, and a maintenance sheet 111-3 on page 300 are output. Thereafter, image reading and inspection are performed on the three maintenance sheets 111-1, 111-2, 111-3, and the inspection results are displayed together with the page numbers (page 100, page 200, and page 300). The user can confirm the number of pages for which the inspection result is defective based on the inspection result and the page number, specify the range of the user document image having the possibility of the image quality defect based on the number of pages, and execute reprinting of the user document image in the range. For example, when the inspection result of page 200 is good and the inspection result of page 300 is bad, the range after page 201 is set as the range to be reprinted.

As described above, according to the first embodiment, the controller 81 controls the print engine 10a, causes the print engine 10a to print the user document image and to perform preliminary ejection onto the maintenance sheet which is a print sheet different from the print sheet of the user document image, and causes the print engine 10a to print the inspection chart image onto the maintenance sheet. Then, the controller 81 (a) displays on a predetermined display device a maintenance sheet setting screen that allows the user to specify output conditions for preliminary ejection and printing of the inspection chart image, (b) specifies the output conditions specified by the user on the maintenance sheet setting screen, and (c) causes the print engine 10a to automatically perform preliminary ejection and printing of the inspection chart image on the maintenance sheet if the output conditions are satisfied when the user document image is printed by the print engine 10a.

As a result, the user can set the output conditions according to the usage status of his/her own image forming apparatus 10 (the number of prints, the amount of ink consumption of each ink color, and the like, in a unit period), and thus wasteful consumption of print sheets due to preliminary ejection and an inspection chart is appropriately suppressed in accordance with the usage status of the user.

Second Embodiment

In the image forming apparatus according to the second embodiment, the above-described output condition includes an interleaf sheet condition. The interleaf sheet condition indicates whether the maintenance sheet is used as an interleaf. Then, an input unit (a check box, a pull-down menu, or the like) for the user to designate the setting value of the interleaf sheet condition is displayed on the maintenance sheet setting screen described above, and similarly, the setting value of the interleaf sheet condition designated by the user is specified by the controller 81 in the input device 72b.

Then, the controller 81 (a) uses a print sheet having a size different from that of the print sheet of the user document image as the maintenance sheet when the use of the maintenance sheet as the interleaf sheet is designated in the interleaf sheet condition, and sets the discharge destination of the maintenance sheet to a sheet discharge unit that is the same as that of the print sheet of the user document image among the plurality of sheet discharge units (here, discharge trays 10c1 and 10c2); and (b) sets the discharge destination of the maintenance sheet to a sheet discharge unit different from that of the print sheet of the user document image among the plurality of sheet discharge units when the use of the maintenance sheet as the interleaf sheet is not designated in the interleaf sheet condition.

For example, the controller 81 controls the sheet conveying unit 10*b* to (a) discharge a print sheet on which the user document image is printed (hereinafter referred to as a user image sheet) to the discharge tray 101*c* among the discharge tray 10*c*1 or 10*c*2, and (b) discharge a maintenance sheet to the discharge tray 10*c*2 different from the discharge tray 10*c*1.

For example, different types of print sheets are stored in the sheet feed cassettes 20-1 and 20-2, and the print sheets stored in the sheet feed cassette 20-1 or the sheet feed cassette 20-2 are used as the user image sheet and the maintenance sheet.

As described above, the controller 81 selects the sheet size and the discharge destination of the maintenance sheet based on the interleaf sheet condition, and designates the sheet feed cassettes 20-1 and 20-2 and the discharge trays 10*c*1 and 10*c*2 for feeding the print sheet used as the maintenance sheet, to the sheet conveying unit 10*b*.

Descriptions of other configurations and operations of the image forming apparatus according to the second embodiment are omitted.

Various changes and modifications to the embodiments described above will be apparent to those skilled in the art. Such changes and modifications may be made without departing from the spirit and scope of the subject matter and without diminishing its intended advantages. It is therefore intended that such changes and modifications be covered by the appended claims.

For example, in the first and second embodiments, the controller 81 may (a) measure the ink consumption amount of the ink color designated by the ink color condition (for example, the ink consumption amount after the previous preliminary ejection), and (b) cause the print engine 10*a* to perform the preliminary ejection and the printing of the inspection chart image at an interval longer (by a predetermined time or a predetermined ratio) than the interval of performing the preliminary ejection and the printing of the inspection chart image based on the performance frequency condition designated by the user according to the ink consumption amount. That is, in this case, when the ink consumption amount is large, the necessity of the preliminary ejection decreases, and thus the output interval of the maintenance sheet is lengthened.

In the first and second embodiments, when the print sheet of the user document image is changed to a print sheet having a sheet size larger than the current sheet size, the controller 81 may cause the print engine 10*a* to perform preliminary ejection and printing of the inspection chart image on the maintenance sheet before the change regardless of the output condition. That is, with respect to the line head type inkjet recording units 1*a* to 1*d*, when a print sheet having a width smaller than the allowable maximum width is continuously used, since the ink nozzles outside the ink nozzles used to eject ink onto the print sheet do not continuously eject ink at all, it is preferable to perform preliminary ejection in order to match the ink ejection state of the unused ink nozzles on the relatively outer side with the ink ejection state of the used ink nozzles on the relatively inner side.

In the first and second embodiments, the above-described output condition may include an inspection frequency condition for printing an inspection chart image on a maintenance sheet. In this case, the user also designates the setting value of the inspection frequency condition on the maintenance sheet setting screen described above. In this case, the controller 81 (*a*) determines whether to print the inspection chart image on the maintenance sheet based on the inspection frequency condition when performing the preliminary ejection on the maintenance sheet, and causes the print engine 10*a* to print the inspection chart image on the maintenance sheet when determining to print the inspection chart image on the maintenance sheet based on the inspection frequency condition, (b1) causes the print engine 10*a* to print the inspection chart image on the maintenance sheet when determining to print the inspection chart image on the maintenance sheet based on the inspection frequency condition, and (b2) does not cause the print engine 10*a* to print the inspection chart image on the maintenance sheet when determining not to print the inspection chart image on the maintenance sheet based on the inspection frequency condition. The inspection frequency condition indicates a constant M for executing inspection chart image printing every M times. That is, for example, when every other inspection chart image print is designated in the inspection frequency condition, the inspection chart image is printed on a certain maintenance sheet when the maintenance sheet is output; when the next maintenance sheet is output, the inspection chart image is not printed on the next maintenance sheet but the preliminary ejection is performed with the minimum amount of ink; and the inspection chart image is printed on the next maintenance sheet when the next maintenance sheet is output. Therefore, in this case, the toner consumption can be reduced by reducing the frequency of printing the inspection chart image.

Further, in the first and second embodiments described above, when the maintenance sheet is discharged to the same discharge tray 10*ci* (i=1, 2) as for the user image sheet, the discharge position of the maintenance sheet in the width direction of the sheet (that is, the direction perpendicular to the discharge direction) may be displaced from the discharge position of the user image sheet by the finisher (not shown).

The present disclosure is applicable to, for example, a line head type inkjet image forming apparatus.

Note that the description of the above embodiment shows one aspect of the image forming apparatus according to the present disclosure, and the technical scope of the present disclosure is not limited to the above embodiment. The present disclosure may be variously changed, substituted, and modified without departing from the spirit of the technical idea, and the claims include all embodiments that can be included in the scope of the technical idea.

What is claimed is:

1. An image forming apparatus comprising:
   a print engine that prints an image to be printed on a print sheet by an inkjet method; and
   a controller that causes the print engine to print a user document image, to perform preliminary ejection on a maintenance sheet that is a print sheet different from a print sheet of the user document image, and to print an inspection chart image onto the maintenance sheet,
   wherein the controller
   (a) displays, on a predetermined display device, a maintenance sheet setting screen that allows a user to specify output conditions for the preliminary ejection and the printing of the inspection chart image,
   (b) specifies the output condition specified by the user on the maintenance sheet setting screen, and
   (c) causes the print engine to automatically perform the preliminary ejection and the printing of the inspection chart image on the maintenance sheet if the output condition is satisfied when the user document image is printed by the print engine, and
   wherein the controller (d) measures an ink consumption amount of the ink color and
(e) causes the print engine to perform the preliminary ejection and the printing of the inspection chart image at an execution interval longer than an execution interval of the preliminary ejection and the printing of the inspection chart image based on the execution frequency condition designated by the user, in accordance with the ink consumption amount.

2. The image forming apparatus according to claim 1, wherein
the output condition includes
(a) an execution frequency condition of the preliminary ejection and the printing of the inspection chart image, and
(b) an ink color condition indicating an ink color in which the preliminary ejection and the printing of the inspection chart image are to be executed, and
when the execution frequency condition is satisfied, the controller causes the print engine to
(a) perform the preliminary ejection and the printing of the inspection chart image on the maintenance sheet for an ink color designated by the ink color condition, and
(b) not perform the preliminary ejection and the printing of the inspection chart image on the maintenance sheet for an ink color not designated by the ink color condition.

3. The image forming apparatus according to claim 1, wherein
the output condition includes an image designation condition for designating an image to be used for the inspection chart image, and
the image designation condition designates any one of a first image, a second image having lower ink consumption than the first image, and a user image, as the inspection chart image.

4. The image forming apparatus according to claim 1, wherein
the controller causes the print engine to perform the preliminary ejection and the printing of the inspection chart image on the maintenance sheet regardless of the output condition when the print sheet of the user document image is changed to a print sheet having a sheet size larger than a current sheet size.

5. The image forming apparatus according to claim 1, wherein
the output condition includes an inspection frequency condition for printing the inspection chart image on the maintenance sheet, and
the controller
(a) determines whether to print the inspection chart image based on the inspection frequency condition when performing the preliminary ejection on the maintenance sheet,
(b1) causes the print engine to print the inspection chart image on the maintenance sheet when determining to print the inspection chart image on the maintenance sheet based on the inspection frequency condition, and
(b2) causes the print engine not to print the inspection chart image on the maintenance sheet when determining not to print the inspection chart image on the maintenance sheet based on the inspection frequency condition.

6. An image forming apparatus comprising:
a print engine that prints an image to be printed on a print sheet by an inkjet method;
a sheet conveying unit that conveys the print sheet;
a plurality of sheet discharge units selectable as discharge destinations of the print sheet on which printing has been completed by the print engine; and
a controller that causes the print engine to print a user document image, to perform preliminary ejection on a maintenance sheet that is a print sheet different from a print sheet of the user document image, and to print an inspection chart image onto the maintenance sheet,
wherein the controller
(a) displays, on a predetermined display device, a maintenance sheet setting screen that allows a user to specify output conditions for the preliminary ejection and the printing of the inspection chart image,
(b) specifies the output condition specified by the user on the maintenance sheet setting screen, and
(c) causes the print engine to automatically perform the preliminary ejection and the printing of the inspection chart image on the maintenance sheet if the output condition is satisfied when the user document image is printed by the print engine,
wherein the output condition includes an interleaf sheet condition, and
wherein the controller
(d) when it is specified that the maintenance sheet is used as an interleaf sheet in the interleaf sheet condition, uses a print sheet having a size different from that of the print sheet of the user document image, as the maintenance sheet, and sets a discharge destination of the maintenance sheet to the same sheet discharge unit as for the print sheet of the user document image among the plurality of sheet discharge units and
(e) when the use of the maintenance sheet is not designated as an interleaf sheet in the interleaf sheet condition, sets the discharge destination of the maintenance sheet to a sheet discharge unit different from that for the print sheet of the user document image among the plurality of sheet discharge units.

7. An image forming apparatus comprising:
an image reading device;
a print engine that prints an image to be printed on a print sheet by an inkjet method; and
a controller that causes the print engine to print a user document image, to perform preliminary ejection on a maintenance sheet that is a print sheet different from a print sheet of the user document image, and to print an inspection chart image onto the maintenance sheet,
wherein the controller
(a) displays, on a predetermined display device, a maintenance sheet setting screen that allows a user to specify output conditions for the preliminary ejection and the printing of the inspection chart image,
(b) specifies the output condition specified by the user on the maintenance sheet setting screen, and
(c) causes the print engine to automatically perform the preliminary ejection and the printing of the inspection chart image on the maintenance sheet if the output condition is satisfied when the user document image is printed by the print engine, and
wherein the controller
(d) causes the print engine to print a page number of the user document image printed immediately before or after the maintenance sheet on the maintenance sheet,
(e) causes the image reading device to read an image of the maintenance sheet,
(f) inspects the image of the maintenance sheet, and (g) displays the page number and a result of the inspection for each maintenance sheet, on a predetermined display device.

* * * * *